(12) United States Patent
Sakiyama et al.

(10) Patent No.: US 10,655,462 B2
(45) Date of Patent: May 19, 2020

(54) ACOUSTIC TOOL ECCENTERING CORRECTION

(71) Applicant: Schlumberger Technology Corporation, Sugar Land, TX (US)

(72) Inventors: Naoki Sakiyama, Tokyo (JP); Wataru Izuhara, Tokyo (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 341 days.

(21) Appl. No.: 15/623,445

(22) Filed: Jun. 15, 2017

(65) Prior Publication Data

US 2018/0003844 A1 Jan. 4, 2018

Related U.S. Application Data

(60) Provisional application No. 62/356,717, filed on Jun. 30, 2016.

(51) Int. Cl.
| | |
|---|---|
| *G01V 1/46* | (2006.01) |
| *G01V 1/50* | (2006.01) |
| *E21B 47/00* | (2012.01) |
| *E21B 49/00* | (2006.01) |
| *G01V 1/48* | (2006.01) |
| *E21B 47/18* | (2012.01) |

(52) U.S. Cl.
CPC .......... *E21B 49/00* (2013.01); *E21B 47/0005* (2013.01); *G01V 1/46* (2013.01); *G01V 1/48* (2013.01); *E21B 47/18* (2013.01); *G01V 2210/1299* (2013.01); *G01V 2210/1429* (2013.01); *G01V 2210/54* (2013.01); *G01V 2210/622* (2013.01); *G01V 2210/6222* (2013.01); *G01V 2210/6242* (2013.01)

(58) Field of Classification Search
CPC ...... E21B 49/00; E21B 47/0005; E21B 47/18; G01V 1/46; G01V 1/48; G01V 2210/6222; G01V 2210/1299; G01V 2210/1429; G01V 2210/6242; G01V 2210/622; G01V 2210/54
USPC .......................................................... 367/30
See application file for complete search history.

(56) References Cited

U.S. PATENT DOCUMENTS

| | | | |
|---|---|---|---|
| 3,304,538 A | 2/1967 | Zill | |
| 3,564,914 A | 2/1971 | Desai | |
| 3,835,953 A | 9/1974 | Summers | |
| 4,255,798 A | 3/1981 | Havira | |

(Continued)

FOREIGN PATENT DOCUMENTS

WO WO2015163852 A1 10/2015

OTHER PUBLICATIONS

Office Action issued in related U.S. Appl. No. 15/623,436 dated Dec. 13, 2018, 33 pages.

(Continued)

*Primary Examiner* — Daniel L Murphy (57) ABSTRACT

An acoustic signal is transmitted from a downhole tool positioned within a wellbore. Amplitudes and travel times of the acoustic signal received at different azimuthal locations of the downhole tool are measured. Correction factors, each corresponding to a different one of the measured amplitudes, are determined based on the travel times measured at each of the different azimuthal locations. Corrected amplitudes are each determined based on the corresponding measured amplitude and the corresponding correction factor.

17 Claims, 8 Drawing Sheets

(56) References Cited

U.S. PATENT DOCUMENTS

| | | |
|---|---|---|
| 4,346,460 A | 8/1982 | Schuster |
| 4,524,432 A | 6/1985 | Johnson |
| 4,757,479 A | 7/1988 | Masson et al. |
| 4,896,303 A | 1/1990 | Leslie et al. |
| 5,089,989 A | 2/1992 | Schmidt et al. |
| 5,354,956 A | 10/1994 | Orban et al. |
| 5,377,160 A | 12/1994 | Tello et al. |
| 5,398,215 A | 3/1995 | Sinha et al. |
| 8,755,248 B2 | 6/2014 | Wang |
| 8,861,307 B2 | 10/2014 | Pabon |
| 2005/0065730 A1 | 3/2005 | Sinha |
| 2018/0003843 A1 | 1/2018 | Hori et al. |
| 2018/0003845 A1 | 1/2018 | Sakiyama et al. |

OTHER PUBLICATIONS

Office Action issue in U.S. Appl. No. 15/623,456 dated Jul. 29, 2019, 33 pages.

ACOUSTIC TOOL ECCENTERING CORRECTION

CROSS-REFERENCE TO RELATED APPLICATIONS

This application claims the benefit of and priority to U.S. Provisional Application No. 62/356,717, entitled "Acoustic Tool Eccentering Correction," filed Jun. 30, 2016, the entire disclosure of which is hereby incorporated herein by reference.

BACKGROUND OF THE DISCLOSURE

The formation of an oil and gas well includes securing a metal casing within a wellbore via cement forming an annular structure between the sidewall of the wellbore and the outer diameter of the casing. Downhole acoustic tools may be utilized for cement bond logging (CBL) to evaluate bonding quality between the casing and the cement, such as by evaluating amplitudes of casing arrivals traveling from a transmitter to the casing and refracted to a sensor axially separated from the transmitter. Downhole acoustic tools may also or instead be utilized for radial bond logging (RBL) to evaluate azimuthal variation of the cement bonding, such as by evaluating casing arrival amplitudes and/or attenuation across sensors at various azimuthal locations around the downhole acoustic tool. However, CBL and RBL both resort to casing arrival amplitudes, which are sensitive to the position of the downhole acoustic tool within the casing. Consequently, eccentering of the downhole acoustic tool from the axis of the casing perturbs casing arrival amplitudes, which can result in inaccurate interpretation of the cement bonding quality.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes transmitting an acoustic signal from a downhole tool positioned within a cased or uncased wellbore, and measuring amplitudes and travel times of the acoustic signal received at different azimuthal locations of the downhole tool. Correction factors, each corresponding to a different one of the measured amplitudes, are then determined based on the travel times measured at each of the different azimuthal locations. Corrected amplitudes are then determined, each based on the corresponding measured amplitude and the corresponding correction factor.

The present disclosure also introduces a method that includes conveying a downhole tool within a cased or uncased wellbore, the downhole tool including a transmitter and multiple receivers, and the receivers being disposed at different relative azimuthal positions. The method also includes operating the downhole tool to transmit an acoustic signal from the transmitter, and to obtain measured amplitudes and arrival times of the acoustic signal at each of the receivers. The method also includes adjusting the measured amplitudes based on the measured arrival times.

The present disclosure also introduces a system including a downhole tool and surface equipment. The downhole tool is for operation within a cased or uncased wellbore, and is operable to transmit an acoustic signal and measure amplitudes and arrival times of the acoustic signal at different azimuthal locations. The surface equipment is disposed at a wellsite surface from which the wellbore extends. One or both of the downhole tool and/or the surface equipment are individually and/or cooperatively operable to adjust each measured amplitude based on the measured arrival times, collectively, to compensate for error in each measured amplitude resulting from eccentering of the downhole tool within the wellbore.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure introduces one or more aspects that may be utilized to correct acoustic signal perturbation caused by tool eccentering. For example, the correction may be determined by processing travel times of casing and/or formation arrivals. If the downhole acoustic tool is eccentered, a sensor at one azimuthal location of the tool that is closer to the casing wall will detect the casing and/or formation arrivals earlier than another sensor at an opposite azimuthal location of the tool. One or more aspects of the present disclosure pertain to determining a correction factor that varies as a function of the arrival times of the casing and/or formation arrival amplitudes, perhaps other environmental variables, and/or the tool response (such as sensor characteristics), to compensate for amplitude errors brought about by the tool eccentering.

Figure 1:
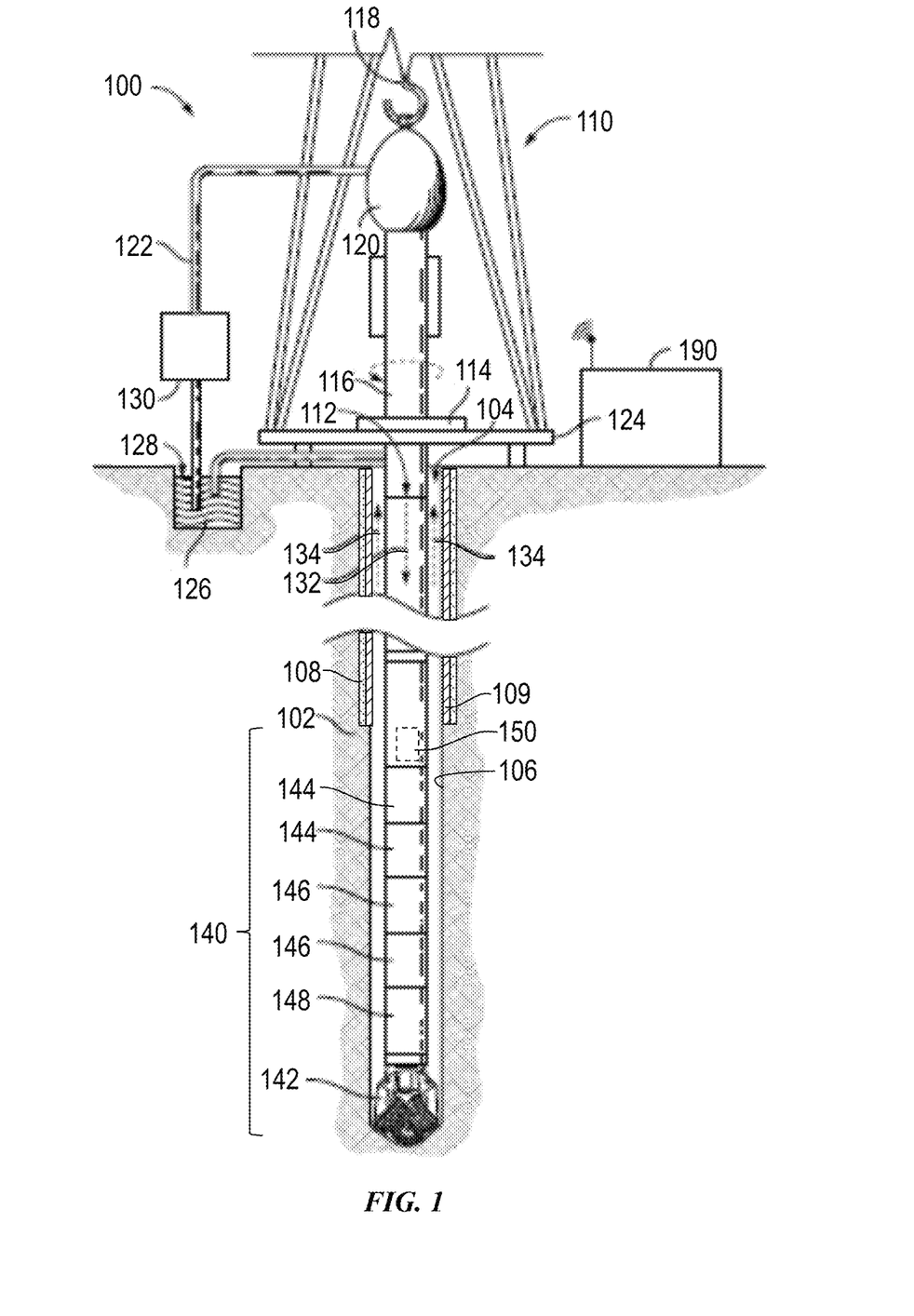
FIG. 1 is a schematic view of at least a portion of an example implementation of apparatus according to one or more aspects of the present disclosure.

FIG. 1 is a schematic view of an example wellsite system 100 to which one or more aspects of the present disclosure may be applicable. The wellsite system 100 may be onshore or offshore. In the example wellsite system 100 shown in FIG. 1, a wellbore 104 is formed in one or more subterranean formation 102 by rotary drilling. Other example systems within the scope of the present disclosure may also or instead utilize directional drilling. While some elements of the wellsite system 100 are depicted in FIG. 1 and described below, it is to be understood that the wellsite system 100 may include other components in addition to, or in place of, those presently illustrated and described.

As shown in FIG. 1, a drillstring 112 suspended within the wellbore 104 comprises a bottom hole assembly (BHA) 140 that includes or is coupled with a drill bit 142 at its lower end. The surface system includes a platform and derrick assembly 110 positioned over the wellbore 104. The platform and derrick assembly 110 may comprise a rotary table 114, a kelly 116, a hook 118, and a rotary swivel 120. The drillstring 112 may be suspended from a lifting gear (not shown) via the hook 118, with the lifting gear being coupled to a mast (not shown) rising above the surface. An example lifting gear includes a crown block affixed to the top of the mast, a vertically traveling block to which the hook 118 is attached, and a cable passing through the crown block and the vertically traveling block. In such an example, one end of the cable is affixed to an anchor point, whereas the other end is affixed to a winch to raise and lower the hook 118 and the drillstring 112 coupled thereto. The drillstring 112 comprises one or more types of tubular members, such as drill pipes, threadedly attached one to another, perhaps including wired drilled pipe.

The drillstring 112 may be rotated by the rotary table 114, which engages the kelly 116 at the upper end of the drillstring 112. The drillstring 112 is suspended from the hook 118 in a manner permitting rotation of the drillstring 112 relative to the hook 118. Other example wellsite systems within the scope of the present disclosure may utilize a top drive system to suspend and rotate the drillstring 112, whether in addition to or instead of the illustrated rotary table system.

The surface system may further include drilling fluid or mud 126 stored in a pit or other container 128 formed at the wellsite. As described above, the drilling fluid 126 may be oil-based mud (OBM) or water-based mud (WBM). A pump 130 delivers the drilling fluid 126 to the interior of the drillstring 112 via a hose or other conduit 122 coupled to a port in the rotary swivel 120, causing the drilling fluid to flow downward through the drillstring 112, as indicated in FIG. 1 by directional arrow 132. The drilling fluid exits the drillstring 112 via ports in the drill bit 142, and then circulates upward through the annulus region between the outside of the drillstring 112 and the wall 106 of the wellbore 104, as indicated in FIG. 1 by directional arrows 134. In this manner, the drilling fluid 126 lubricates the drill bit 142 and carries formation cuttings up to the surface as it is returned to the container 128 for recirculation.

The BHA 140 may comprise one or more specially made drill collars near the drill bit 142. Each such drill collar may comprise one or more devices permitting measurement of downhole drilling conditions and/or various characteristic properties of the subterranean formation 102 intersected by the wellbore 104. For example, the BHA 140 may comprise one or more logging-while-drilling (LWD) modules 144, one or more measurement-while-drilling (MWD) modules 146, a rotary-steerable system and motor 148, and perhaps the drill bit 142. Of course, other BHA components, modules, and/or tools are also within the scope of the present disclosure, and such other BHA components modules and/or tools may be positioned differently in the BHA 140.

The LWD modules 144 may comprise a downhole acoustic tool for evaluating a region of the wellbore 104 surrounding the acoustic tool. For example, the acoustic tool may be utilized within a cased region of the wellbore 104 for evaluating bonding quality of cement 108 securing a casing 109 that lines at least a portion of the wellbore 104. The acoustic tool may also be utilized within an uncased wellbore, or an uncased region of the wellbore 104, for evaluating the formation 102 surrounding the wellbore 104, such as for evaluating elastic properties of the formation 102. Example aspects of such acoustic tools are described below.

The MWD modules 146 may comprise one or more devices for measuring characteristics of the drillstring 112 and/or the drill bit 142, such as for measuring weight-on-bit, torque, vibration, shock, stick slip, tool face direction, and/or inclination, among others. The MWD modules 156 may further comprise an apparatus (not shown) for generating electrical power to be utilized by the downhole system. This may include a mud turbine generator powered by the flow of the drilling fluid 126. Other power and/or battery systems may also or instead be employed.

The wellsite system 100 also includes a data processing system that can include one or more, or portions thereof, of the following: the surface equipment 190, control devices and electronics in one or more modules of the BHA 140 (such as a downhole controller 150), a remote computer system (not shown), communication equipment, and other equipment. The data processing system may include one or more computer systems or devices and/or may be a distributed computer system. For example, collected data or information may be stored, distributed, communicated to an operator, and/or processed locally or remotely.

The data processing system may, individually or in combination with other system components, perform the methods and/or processes described below, or portions thereof. For example, such data processing system may include processor capability for collecting data relating to the amplitude and travel/arrival times of acoustic signals transmitted and received by an acoustic tool of the LWD modules 144. Methods and/or processes within the scope of the present disclosure may be embodied in one or more computer programs that run in a processor located, for example, in one or more modules of the BHA 140 and/or the surface equipment 190. Such programs may utilize data received from the BHA 140 via mud-pulse telemetry and/or other telemetry means, and/or may transmit control signals to operative elements of the BHA 140. The programs may be stored on a tangible, non-transitory, computer-usable storage medium associated with the one or more processors of the BHA 140 and/or surface equipment 190, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

Figure 2:
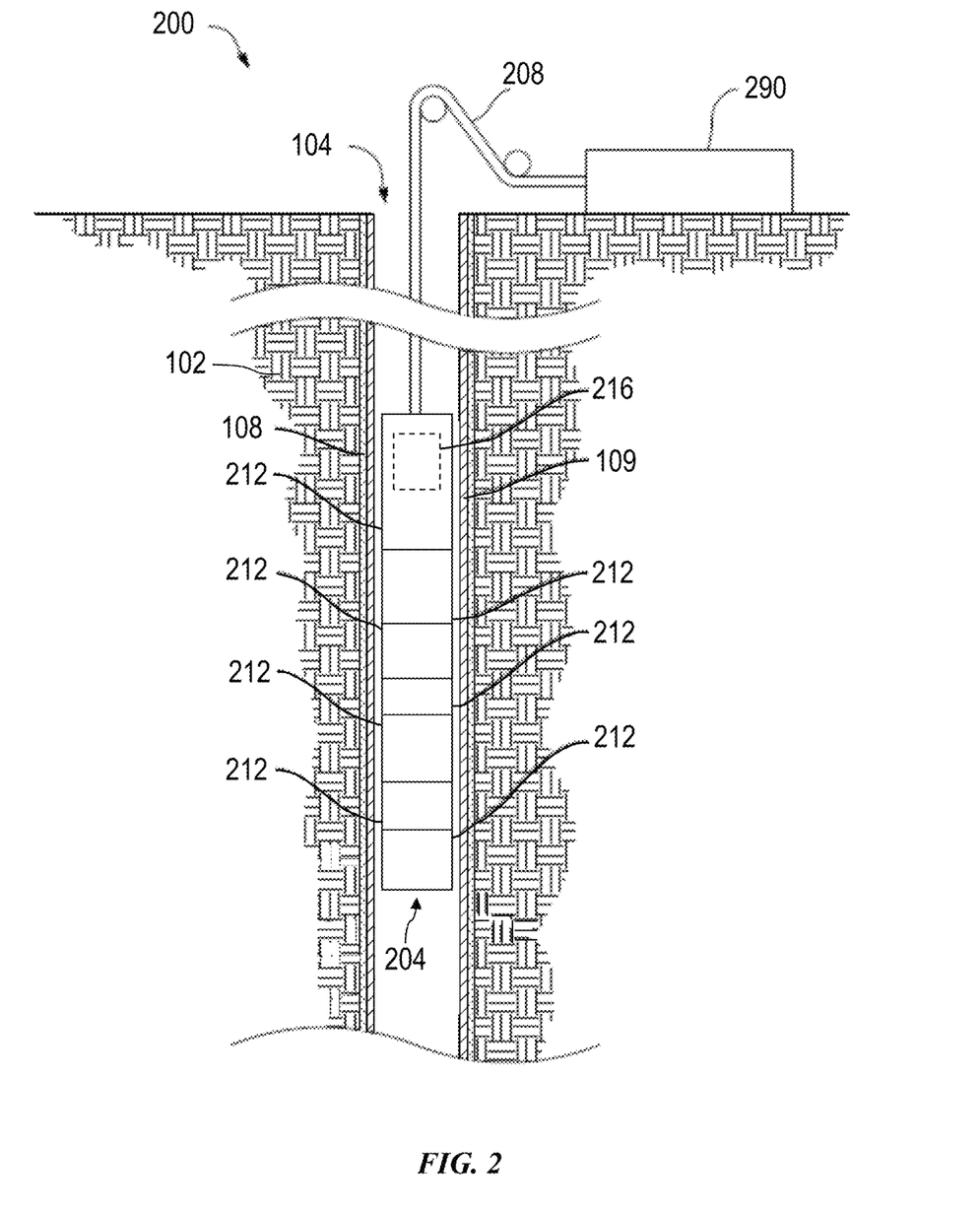
FIG. 2 is a schematic view of at least a portion of an example implementation of apparatus according to one or more aspects of the present disclosure.

FIG. 2 is a schematic view of another example wellsite system 200 to which one or more aspects of the present disclosure may be applicable. The wellsite system 200 may be onshore or offshore. In the example wellsite system 200 shown in FIG. 2, a tool string 204 is conveyed into the wellbore 104 via a wireline and/or other conveyance means 208. As with the wellsite system 100 shown in FIG. 1, the example wellsite system 200 of FIG. 2 may be utilized for evaluation of the wellbore 104, the cement 108 securing the casing 109 within the wellbore 104, and/or the formation 102 penetrated by the wellbore 104.

The tool string 204 is suspended in the wellbore 104 from the lower end of the wireline 208, which may be a multi-conductor logging cable spooled on a winch (not shown). The wireline 208 may include at least one conductor that facilitates data communication between the tool string 204 and surface equipment 290 disposed on the surface. The surface equipment 290 may have one or more aspects in common with the surface equipment 190 shown in FIG. 1.

The tool string 204 and wireline 208 may be structured and arranged with respect to a service vehicle (not shown) at the wellsite. For example, the wireline 208 may be connected to a drum (not shown) at the wellsite surface, permitting rotation of the drum to raise and lower the tool string 204. The drum may be disposed on a service truck or a stationary platform. The service truck or stationary platform may further contain the surface equipment 290.

The tool string 204 comprises one or more elongated housings encasing various electronic components and modules schematically represented in FIG. 2. For example, the illustrated tool string 204 includes several modules 212, at least one of which may be or comprise at least a portion of an acoustic tool as described below. Other implementations of the downhole acoustic tool 240 within the scope of the present disclosure may include additional or fewer components or modules relative to the example implementation depicted in FIG. 2.

The wellsite system 200 also includes a data processing system that can include one or more, or portions thereof, of the following: the surface equipment 290, control devices and electronics in one or more modules of the tool string 204 (such as a downhole controller 216), a remote computer system (not shown), communication equipment, and other equipment. The data processing system may include one or more computer systems or devices and/or may be a distributed computer system. For example, collected data or information may be stored, distributed, communicated to an operator, and/or processed locally or remotely.

The data processing system may, individually or in combination with other system components, perform the methods and/or processes described below, or portions thereof. For example, such data processing system may include processor capability for collecting data relating to the evaluation of the cement 108 and/or the formation 102 according to one or more aspects of the present disclosure. Methods and/or processes within the scope of the present disclosure may be embodied in one or more computer programs that run in a processor located, for example, in one or more modules 212 of the tool string 204 and/or the surface equipment 290. Such programs may utilize data received from the downhole controller 216 and/or other modules 212 via the wireline 208, and may transmit control signals to operative elements of the tool string 204. The programs may be stored on a tangible, non-transitory, computer-usable storage medium associated with the one or more processors of the downhole controller 216, other modules 212 of the tool string 204, and/or the surface equipment 290, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

While FIGS. 1 and 2 illustrate example wellsite systems 100 and 200, respectively, that convey a downhole tool/string into a wellbore, other example implementations consistent with the scope of this disclosure may utilize other conveyance means to convey a tool into a wellbore, including coiled tubing, tough logging conditions (TLC), slickline, and others. Additionally, other downhole tools within the scope of the present disclosure may comprise components in a non-modular construction also consistent with the scope of this disclosure.

Figure 3:
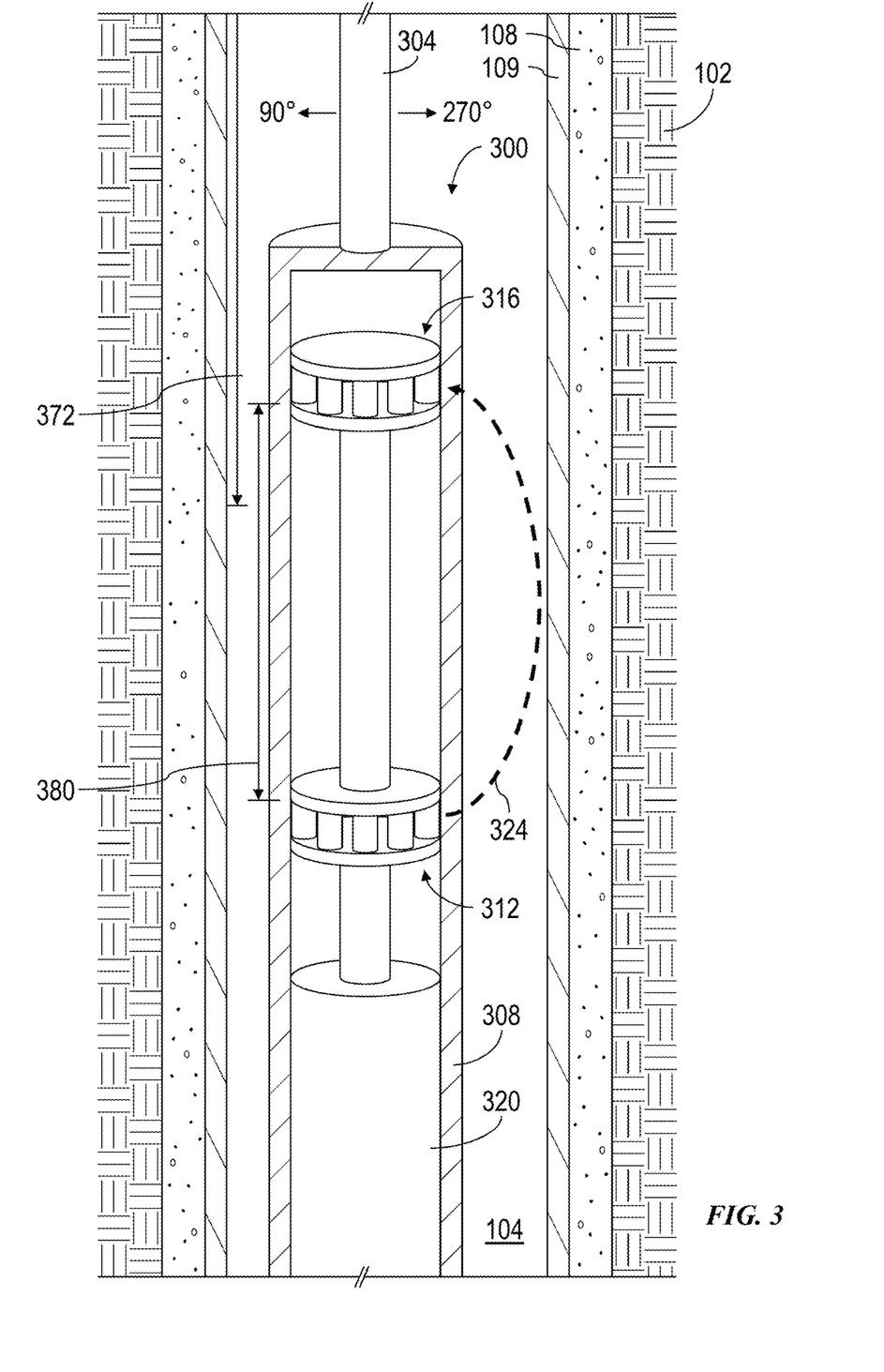
FIG. 3 is a schematic view of a portion of an example implementation of apparatus according to one or more aspects of the present disclosure.

FIG. 3 is a schematic sectional view of at least a portion of an example implementation of an acoustic tool 300 according to one or more aspects of the present disclosure. The acoustic tool 300 may be implemented as one or more of the LWD modules 144 shown in FIG. 1 and/or one or more of the modules 212 shown in FIG. 2, and may thus be conveyed within the wellbore 104 via drill string, wireline, and/or other conveyance means 304 schematically depicted in FIG. 3. The acoustic tool 300 may be utilized to evaluate the cement 108 securing the casing 109 within the wellbore 104, and/or to evaluate the formation 102 surrounding the wellbore 104, according to one or more aspects of the present disclosure.

The acoustic tool 300 includes a housing (or multiple housings) 308 encasing a transmitter unit 312, a receiver unit 316, and electronics 320. The electronics 320 may be, comprise, or form at least a portion of the downhole controller 150 shown in FIG. 1 or the downhole controller 216 shown in FIG. 2. The electronics 320 are operable to, for example, cause the transmitter unit 312 to emit an acoustic signal 324 and detect the acoustic signal 324 with the receiver unit 316, such as for detecting the travel time of the acoustic signal 324 between the transmitter unit 312 and the receiver unit 316 and the amplitude of the acoustic signal 324 received at the receiver unit 316. To increase clarity and aid with understanding, additional features and components of the acoustic tool 300 not relevant to the following description are omitted in FIG. 3, but it is understood that such features and components may exist in various implementations within the scope of the present disclosure.

Figure 4:
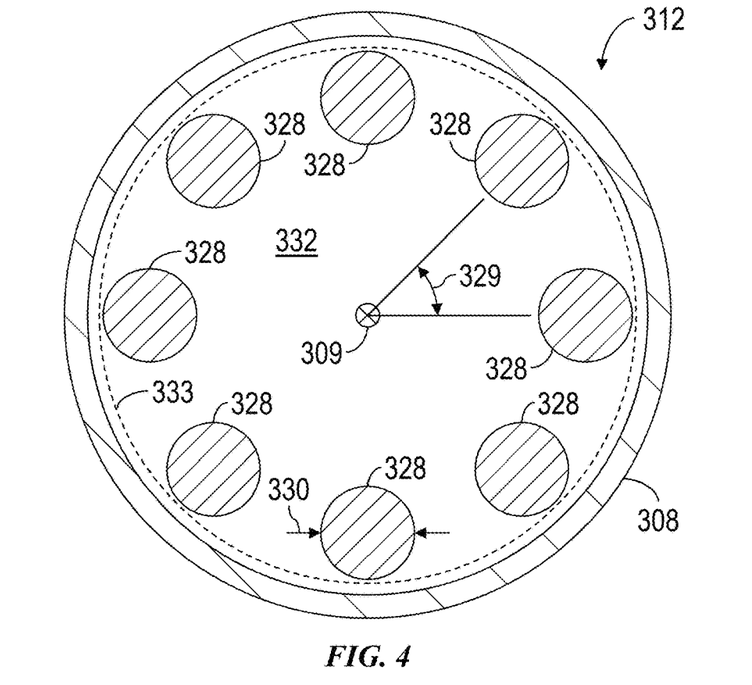
FIGS. 4 and 5 are sectional views of the apparatus shown in FIG. 3.

FIG. 4 is a sectional schematic view of at least a portion of an example implementation of the transmitter unit 312 shown in FIG. 3. The example transmitter unit 312 comprises eight transmitters 328 positionally fixed within the housing 308 via an attachment structure 332. The transmitters 328 are independently and/or collectively operable to excite acoustic energy to induce monopole, dipole, and other higher order azimuthal modes, depending on which transmitters 328 are excited simultaneously and their polarity, to generate acoustic signals 324 as depicted in FIG. 3. In addition, by exciting each transmitter 328 one-by-one, a unipole excitation may also be achieved. Each transmitter 328 may comprise a substantially cylindrical portion of piezoelectric ceramic material, such as PCT C-64, and/or other materials permitting each transmitter 328 to independently operate as a point source. The frequency of the acoustic signals 324 generated by the transmitters 328 may vary within the scope of the present disclosure, such as between about 20 kHz and about 200 kHz, with example implementations including frequencies of about 30 kHz and about 100 kHz.

The transmitters 328 are distributed azimuthally around a central axis 309 of the housing 308. The azimuthal spacing 329 between neighboring ones of the transmitters 328 may be about 45 degrees. Each transmitter 328 may have a diameter 330 ranging between about 1.5 centimeters (cm) and about 5 cm, and a length (extending into and out of the page) ranging between about 2.5 cm and about 10 cm. However, other numbers, spacing, and sizes of the transmitters 328 are also within the scope of the present disclosure.

Implementations within the scope of the present disclosure also include those in which the transmitter unit 312 is a conventional monopole source. For example, such implementations may comprise a single transmitter 333, represented in FIG. 4 by a dashed-line circle encompassing the array of smaller transmitters 328. Implementations within the scope of the present disclosure may also comprise other types and arrangements of acoustic transmitters, whether instead of or in addition to the example implementations depicted in FIGS. 3 and 4.

Figure 5:
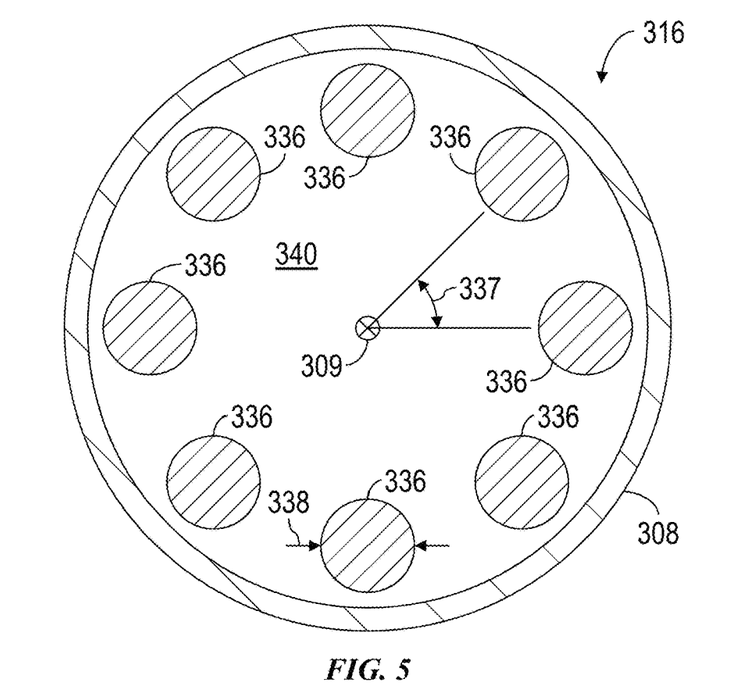

FIG. 5 is a sectional schematic view of at least a portion of an example implementation of the receiver unit 316 shown in FIG. 3. The example receiver unit 316 comprises eight receivers 336 positionally fixed within the housing 308 via an attachment structure 340. The receivers 336 are each independently operable to detect acoustic energy excited by the transmitter unit 312, whether transmitted as unipole, monopole, dipole, and other higher order azimuthal modes. Thus, the receivers 336 may be used for measuring amplitudes and travel times of the acoustic signals 324 as depicted in FIG. 3.

The receivers 336 are distributed azimuthally around the central axis 309 of the housing 308. The azimuthal spacing 337 between neighboring ones of the receivers 336 may be about 45 degrees, and each receiver 336 may be substantially aligned azimuthally with a corresponding one of the transmitters 328, or the array of receivers 336 may be azimuthally offset from the array of transmitters 328, such as in implementations in which the array of receivers 336 is rotated 20-25 degrees around the central axis 309 relative to the array of transmitters 328. Each receiver 336 may have a diameter 338 ranging between about 1.5 cm and about 5 cm, and a length (extending into and out of the page) ranging between about 2.5 cm and about 10 cm. However, other numbers, spacing, and sizes of the receivers 336 are also within the scope of the present disclosure.

Each receiver 336 may comprise a substantially cylindrical portion of piezoelectric ceramic material, such as PCT C-64, and/or other materials permitting each receiver 336 to operate as an individual receiver at the operating frequencies described above with respect to the transmitter unit 312. Implementations within the scope of the present disclosure may also comprise other types and arrangements of acoustic receivers, whether instead of or in addition to the example implementations depicted in FIGS. 3 and 5.

Figure 6:
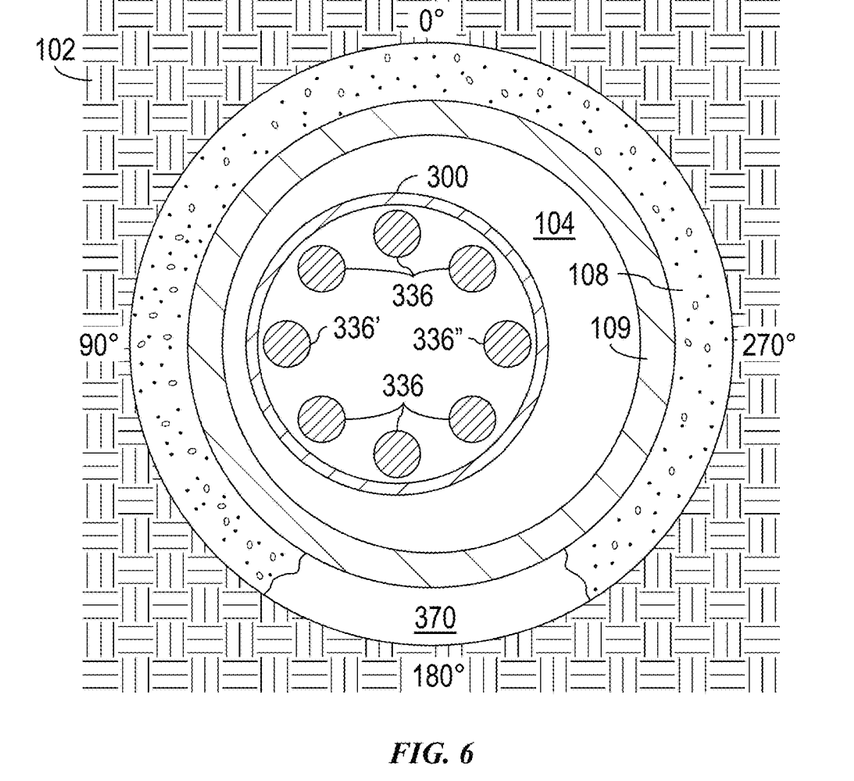
FIG. 6 is a sectional view of the apparatus shown in FIG. 3.

As described above, if the acoustic tool 300 is eccentered within the wellbore 104, a receiver 336 at one azimuthal location that is closer to the casing 109 (or the wall 106 of the wellbore 104 in open-hole implementations) will detect arrivals earlier than the azimuthally opposite receiver 336. FIG. 3 depicts such eccentering of the acoustic tool 300 within the casing 109, and FIG. 6 is a schematic sectional view depicting such eccentering of the acoustic tool 300 and the receivers 336. In the following description, 0° azimuth is into the page in FIG. 3 and the top of the page in FIG. 6, 90° azimuth is in the left-hand direction in FIGS. 3 and 6, 180° azimuth is out of the page in FIG. 3 and the bottom of the page in FIG. 6, and 270° azimuth is in the right-hand direction in FIGS. 3 and 6.

As a result of the eccentered position of the acoustic tool 300 in the 90° azimuth direction, one of the receivers 336 located nearest an azimuth of 90° (designated in FIG. 6 by reference number 336') is positioned closer to the casing 109, and another one of the receivers 336 located nearest an azimuth of 270° (designated in FIG. 6 by reference number 336") is positioned farther from the casing 109, relative to the other receivers 336. FIG. 6 also depicts a defect 370 in the cement 108, such as a channel or other damage, at a depth 372 (shown in FIG. 3) in the wellbore 104 proximate the acoustic tool 300. The defect 370 is centered at an azimuth of about 180°, and extends azimuthally between about 150° and about 210°.

Figure 7:
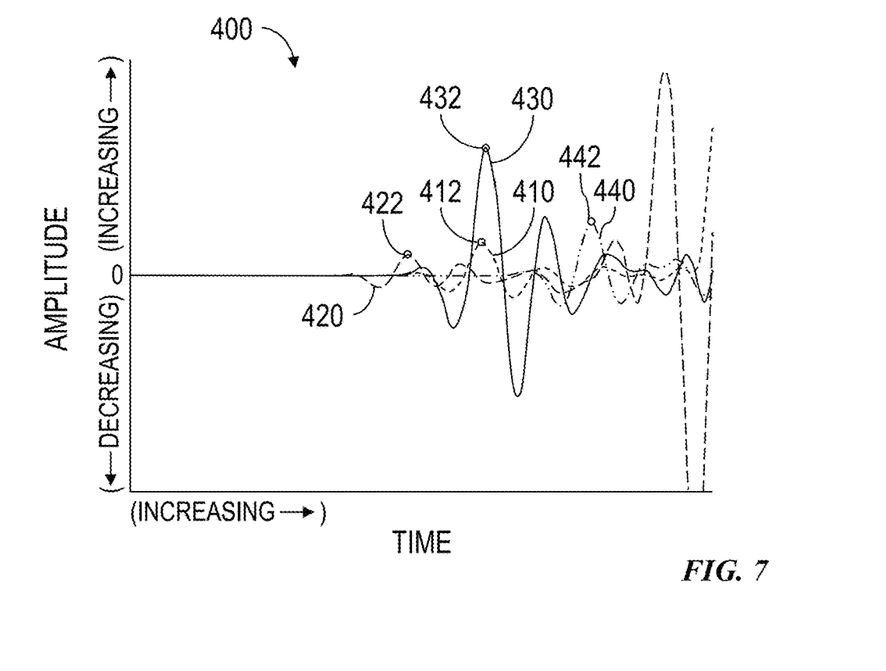
FIG. 7 is a graph depicting one or more aspects related to the present disclosure.

FIG. 7 is a graph 400 depicting examples of modeled waveforms acquired with the geometry shown in FIGS. 3 and 6, with measured amplitudes on the vertical axis and time on the horizontal axis. The graph 400 includes a curve 410 depicting amplitude with respect to time as measured by the receiver 336 at 0° azimuth, including a first registerable arrival 412 (e.g., accounting for noise). Similarly, a curve 420 and first arrival 422 correspond to the receiver 336' at 90° azimuth, a curve 430 and first arrival 432 correspond to the receiver 336 at 180° azimuth, and a curve 440 and first arrival 442 correspond to the receiver 336" at 270° azimuth. The graph depicts amplitude of the casing arrivals at 180° as the largest, due to the absence of the cement 108 at the defect 370. Arrival time of the casing arrivals at 90° is fastest due to the receiver 336' being positioned closest to the casing 109, while arrival time of the casing arrivals at 270° is slowest due to the receiver 336" being positioned farthest from the casing 109.

Although FIGS. 3 and 6 show the acoustic tool 300 located within a wellbore region comprising the casing 109 retained by the cement 108 and FIG. 7 shows the modeled waveforms acquired with the acoustic tool 300 while located within the cased region shown in FIGS. 3 and 6, it is to be understood that the acoustic tool 300 within the scope of the present disclosure may be utilized similarly as described above within an uncased region of the wellbore 104 to evaluate the formation 102 surrounding the acoustic tool 300. For example, the acoustic tool 300 may be utilized to evaluate elastic properties of the formation 102, including azimuthal heterogeneity and/or anisotropy.

Figure 8:
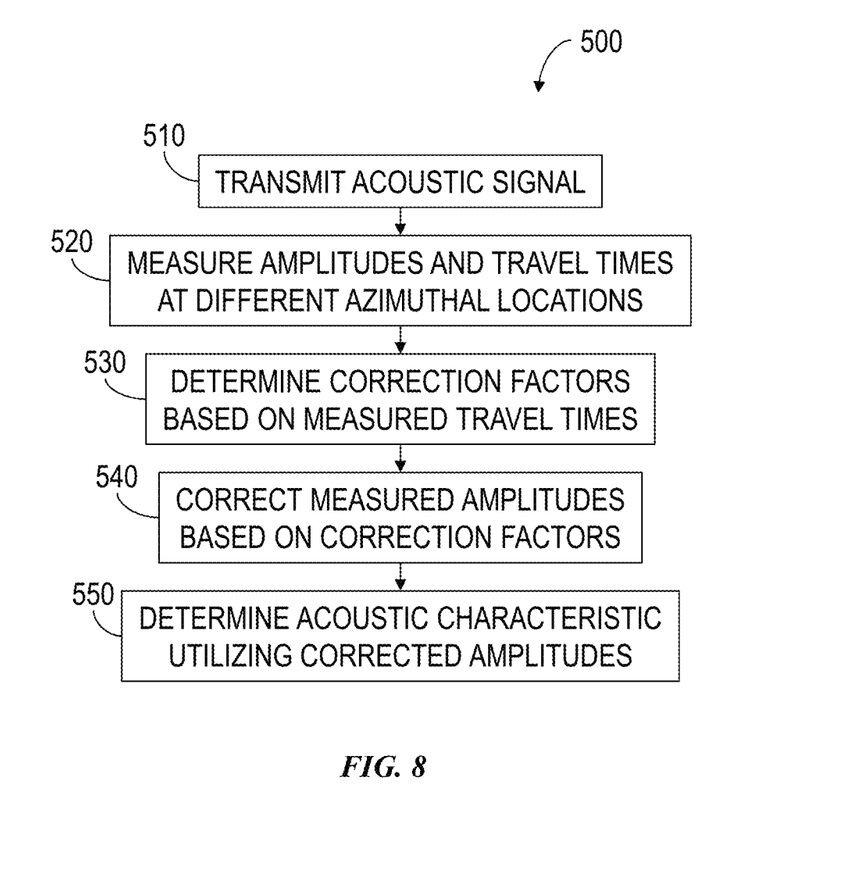
FIG. 8 is a flow-chart diagram of at least a portion of an example implementation of a method according to one or more aspects of the present disclosure.

FIG. 8 is a flow-chart diagram of at least a portion of an example implementation of a method (500) of correcting the measured amplitudes to account for eccentering according to one or more aspects of the present disclosure. The method (500) comprises transmitting (510) the acoustic signal 324, measuring (520) amplitudes and travel times of the acoustic signal utilizing ones of the receivers 336 at different azimuthal locations, and determining (530) correction factors each corresponding to a different one of the measured (520) amplitudes. Each correction factor is determined (530)

based on the travel times measured (520) at each of the different azimuthal locations. Corrected amplitudes may then be determined (540), each based on the corresponding measured (520) amplitude and the corresponding determined (530) correction factor.

Determining (530) the correction factors may be further based on at least one of a plurality of acoustic-error-related (AER) variables. The AER variables may include azimuthal separation between the transmitter 328 (from which the acoustic signal 324) originated and at least one of the receivers 336 that was utilized to measure (520) amplitudes and arrival times. The AER variables may also or instead include the axial separation 380 between the transmitter 328 and at least one of the receivers 336, as depicted in FIG. 3. The AER variables may also or instead include one or more of the diameter of the wellbore 104, the inner diameter of the casing 109, the outer diameter of the casing 109, the radial thickness of the casing 109, the radial thickness of the cement 108, the composition of drilling mud (not shown) substantially surrounding the acoustic tool 300 within the casing 109, the density of the drilling mud, and/or the acoustic slowness of the drilling mud. The AER variables may also include the tool response, such as sensor characteristics. For example, determining (530) the correction factors based on at least one of the AER variables may utilize a look-up table that predicts the correction factors based on one or more of the measured (520) travel times and one or more of the AER variables.

Determining (530) the correction factors may also or instead utilize variation of the measured (520) travel times as a function of azimuth, actual radial positions of the transmitter 328 and receivers 336, and hypothetical radial positions of the transmitter 328 and receivers 336 based on the acoustic tool 300 hypothetically being centered within the wellbore 104. For example, the correction factors may be determined (530) utilizing a correction function, such as set forth below in Equation (1).

$$g_i(t_i, r_i) = [\Delta t_i / \max(\Delta t_i)] \cdot A \cdot \log_{10}(r_{eccenter}/r_{center}) \quad (1)$$

where:
the receivers 336 include a number n of receivers;
the subscript i is an index from 1 to n;
$t_i$ is the measured arrival time at the ith receiver 336 at the ith azimuthal position;
$g_i$ is the correction function for $t_i$;
$r_i$ is the ith receiver 336 at the ith azimuthal position;
$\Delta t_i$ is the difference between $t_i$ and $t_x$, a specific one of the measured arrival times;
$\max \Delta t_i$ is the maximum of each of the $\Delta t_i$;
A is an adjustment effectiveness parameter;
$r_{eccenter}$ is actual radial position, from the longitudinal axis of the casing or uncased wellbore, of $r_i$; and
$r_{center}$ is hypothetical radial position, from the longitudinal axis of the casing or uncased wellbore, of $r_i$ with the downhole tool centered within the casing or uncased wellbore.

The method (500) may also comprise determining (550) acoustic characteristics at the different azimuthal locations utilizing the corrected (540) amplitudes. For example, the determined (550) acoustic characteristic may be utilized to determine characteristics of the cement 108 at the different azimuthal locations, such as bonding quality between the cement 108 and the casing 109. The determined (550) acoustic characteristics may also be indicative of a degree of existence or non-existence of the cement 108. The determined (550) acoustic characteristics may also or instead be utilized to evaluate elastic properties of the formation 102, such as azimuthal heterogeneity and/or anisotropy. As described above, because the acoustic tool 300 is eccentered, the determined (550) acoustic characteristics at one or more of the different azimuthal locations would be inaccurate if determined utilizing the measured (520) amplitudes instead of the corrected (540) amplitudes.

Figure 9:
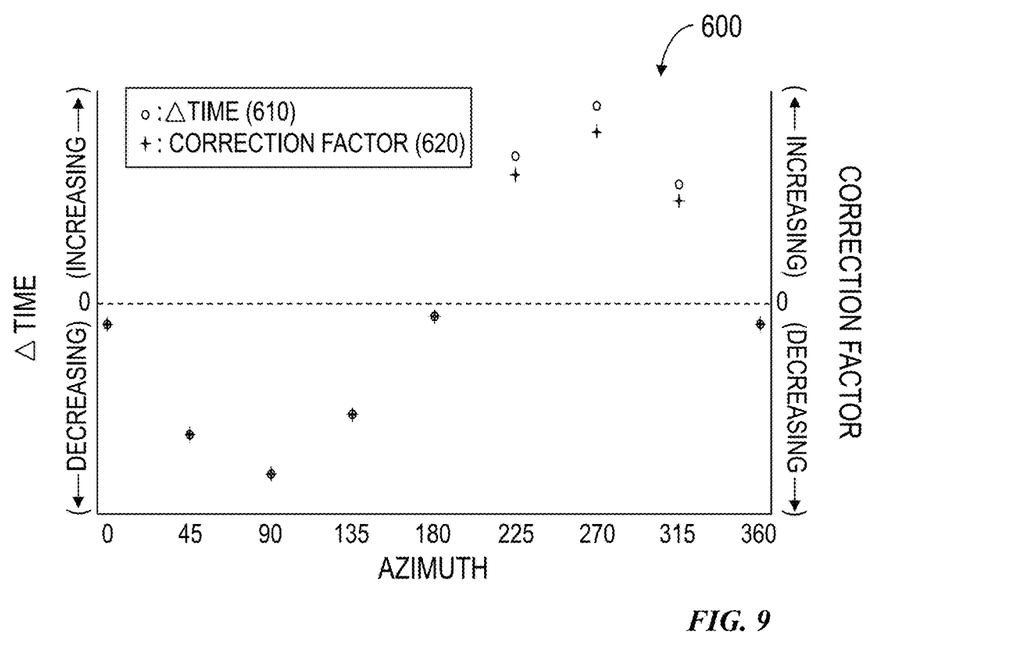
FIGS. 9 and 10 are graphs each depicting one or more aspects related to the present disclosure.
Figure 10:
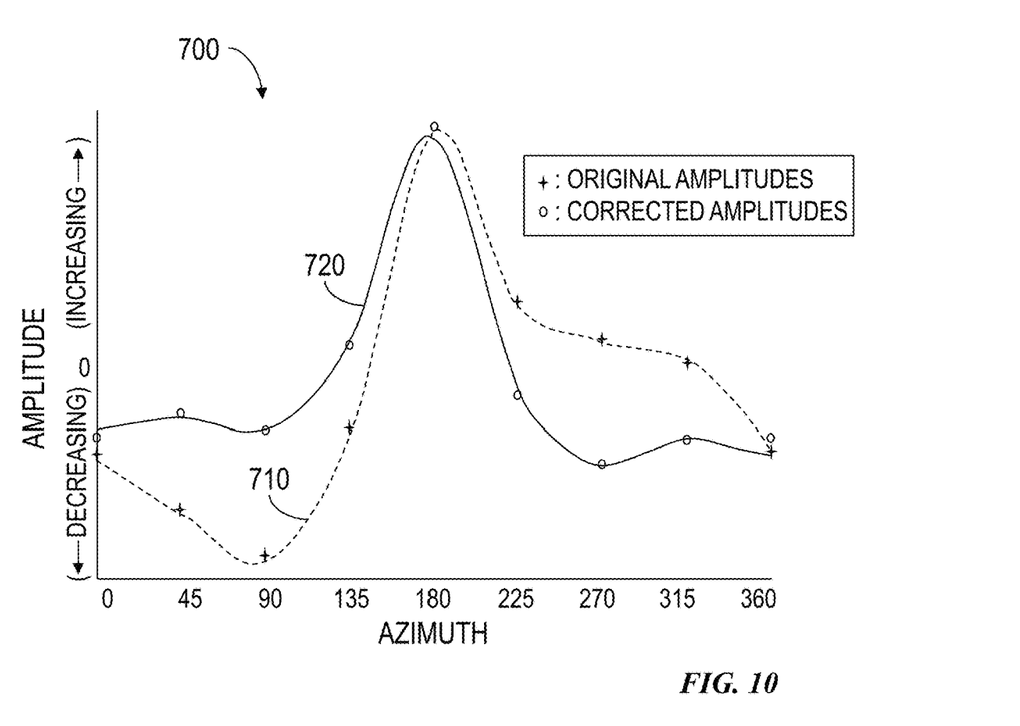

FIG. 9 is a graph 600 depicting, on the first vertical axis, example arrival time variation 610 of measured casing arrivals for the receivers 336 azimuthally spaced at 45° interval for the example scenario depicted in FIGS. 3 and 6. The graph 600 also depicts, on the second vertical axis, example correction factors 620 corresponding to the receivers 336 and determined utilizing Equation (1) set forth above. FIG. 10 is a graph 700 showing the effect of applying the example correction factors 620 to the original amplitudes ($A_i$ in Equation (1) set forth above). The graph 700 includes a curve 710 illustrating how the tool eccentering perturbs the original amplitudes, and can lead to inaccuracies in the interpretation of the amplitudes when evaluating the cement 108. The graph 700 also includes a curve 720 representing correction of the original amplitudes as described above by subtracting the correction factors ($A_i$ in Equation (1) set forth above) from the original amplitudes ($A_i$), resulting in a smooth curve as a function of azimuth.

Figure 11:
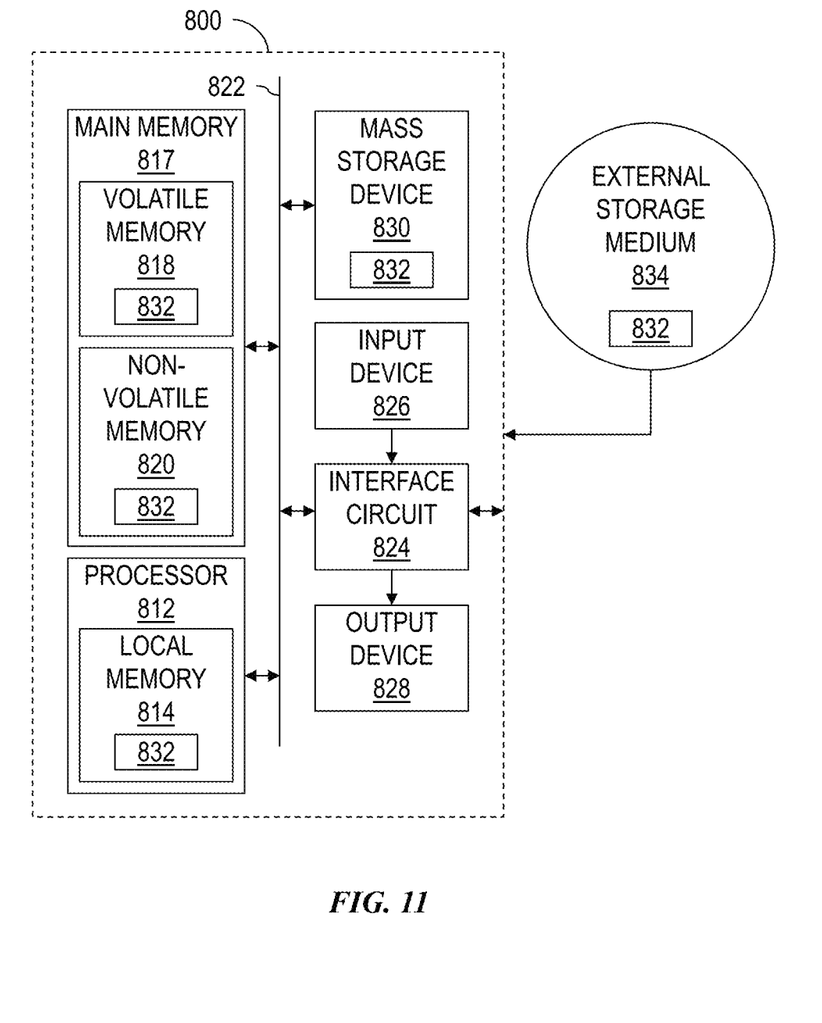
FIG. 11 is a schematic view of at least a portion of an example implementation of apparatus according to one or more aspects of the present disclosure.

FIG. 11 is a schematic view of at least a portion of an example implementation of a processing system 800 according to one or more aspects of the present disclosure. The processing system 800 may execute example machine-readable instructions to implement at least a portion of one or more of the methods and/or processes described herein, and/or to implement a portion of one or more of the example downhole tools described herein. The processing system 800 may be or comprise, for example, one or more processors, controllers, special-purpose computing devices, servers, personal computers, personal digital assistant (PDA) devices, smartphones, internet appliances, and/or other types of computing devices. Moreover, while it is possible that the entirety of the processing system 800 shown in FIG. 11 is implemented within downhole apparatus described above, one or more components or functions of the processing system 800 may also or instead be implemented in wellsite surface equipment, perhaps including the surface equipment 190 depicted in FIG. 1, the surface equipment 290 depicted in FIG. 2, and/or other surface equipment.

The processing system 800 may comprise a processor 812 such as, for example, a general-purpose programmable processor. The processor 812 may comprise a local memory 814, and may execute program code instructions 832 present in the local memory 814 and/or another memory device. The processor 812 may execute, among other things, machine-readable instructions or programs to implement the methods and/or processes described herein. The programs stored in the local memory 814 may include program instructions or computer program code that, when executed by an associated processor, cause a controller and/or control system implemented in surface equipment and/or a downhole tool to perform tasks as described herein. The processor 812 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 812 may be in communication with a main memory 817, such as via a bus 822 and/or other communication means. The main memory 817 may comprise a volatile memory 818 and a non-volatile memory 820. The volatile memory 818 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 820 may be, comprise, or be implemented by read-only memory, flash memory, and/or other types of memory devices. One or more memory controllers (not shown) may control access to the volatile memory 818 and/or the non-volatile memory 820.

The processing system 800 may also comprise an interface circuit 824. The interface circuit 824 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 824 may also comprise a graphics driver card. The interface circuit 824 may also comprise a communication device such as a modem or network interface card to facilitate exchange of data with external computing devices via a network, such as via Ethernet connection, digital subscriber line (DSL), telephone line, coaxial cable, cellular telephone system, and/or satellite, among other examples.

One or more input devices 826 may be connected to the interface circuit 824. One or more of the input devices 826 may permit a user to enter data and/or commands for utilization by the processor 812. Each input device 826 may be, comprise, or be implemented by a keyboard, a mouse, a touchscreen, a track-pad, a trackball, an image/code scanner, and/or a voice recognition system, among other examples.

One or more output devices 828 may also be connected to the interface circuit 824. One or more of the output devices 828 may be, comprise, or be implemented by a display device, such as a liquid crystal display (LCD), a light-emitting diode (LED) display, and/or a cathode ray tube (CRT) display, among other examples. One or more of the output devices 828 may also or instead be, comprise, or be implemented by a printer, speaker, and/or other examples.

The processing system 800 may also comprise a mass storage device 830 for storing machine-readable instructions and data. The mass storage device 830 may be connected to the interface circuit 824, such as via the bus 822. The mass storage device 830 may be or comprise a floppy disk drive, a hard disk drive, a compact disk (CD) drive, and/or digital versatile disk (DVD) drive, among other examples. The program code instructions 832 may be stored in the mass storage device 830, the volatile memory 818, the non-volatile memory 820, the local memory 814, and/or on a removable storage medium 834, such as a CD or DVD.

The mass storage device 830, the volatile memory 818, the non-volatile memory 820, the local memory 814, and/or the removable storage medium 834 may each be a tangible, non-transitory storage medium. The modules and/or other components of the processing system 800 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the claims and the figures, a person having ordinary skill in the art will readily recognize that the present disclosure introduces a method comprising: transmitting an acoustic signal from a downhole tool positioned within a wellbore; measuring amplitudes and travel times of the acoustic signal received at different azimuthal locations of the downhole tool; determining correction factors, each corresponding to a different one of the measured amplitudes, based on the travel times measured at each of the different azimuthal locations; and determining corrected amplitudes each based on the corresponding measured amplitude and the corresponding correction factor.

The method may further comprise utilizing the corrected amplitudes to determine a characteristic of a region corresponding to the different azimuthal locations, wherein the region is of either: cement substantially surrounding a casing within the wellbore; or a subterranean formation into which the wellbore extends. The characteristic may be bonding quality between the cement and the casing. The characteristic may be indicative of a degree of existence or non-existence of the cement. The region may be of the subterranean formation, and the characteristic may be an elastic property of the subterranean formation. The downhole tool may be eccentered within the wellbore, such that the determined characteristic corresponding to one or more of the different azimuthal locations would be inaccurate if determined utilizing the measured amplitudes instead of the corrected amplitudes.

Determining the correction factors may be further based on at least one of a plurality of AER variables. For example, the AER variables may include azimuthal separation between: a transmitter of the downhole tool that transmits the acoustic signal; and at least one of a plurality of receivers of the downhole tool, wherein the receivers may be each disposed at a corresponding one of the different azimuthal locations and may generate signals indicative of the measured amplitudes and arrival times. The AER variables may also or instead include at least one of: axial separation between the transmitter and at least one of the receivers; diameter of the wellbore; inner diameter of a casing of the wellbore; outer diameter of the casing; radial thickness of the casing; radial thickness of cement substantially surrounding the casing within the wellbore; composition of drilling mud substantially surrounding the downhole tool within the casing; density of the drilling mud; acoustic slowness of the drilling mud; and/or sensor characteristics and/or other response characteristics of the downhole tool. The correction factors may be determined utilizing a look-up table that predicts the correction factors based on: one or more of the measured travel times; and one or more of the AER variables.

The downhole tool may be eccentered within the wellbore, and the correction factors may be determined utilizing: variation of the measured travel times as a function of azimuth; actual radial positions of the transmitter and receivers of the eccentered downhole tool; and hypothetical radial positions of the transmitter and receivers based on the downhole tool hypothetically being centered within the wellbore. For example, the correction factors may be determined by Equation (1) set forth above.

The present disclosure also introduces a method comprising: (A) conveying a downhole tool within a wellbore, wherein the downhole tool comprises a transmitter and a plurality of receivers, and wherein the receivers are disposed at different relative azimuthal positions; (B) operating the downhole tool to: (1) transmit an acoustic signal from the transmitter; and (2) obtain measured amplitudes and arrival times of the acoustic signal at each of the receivers; and (C) adjusting the measured amplitudes based on the measured arrival times.

The method may further comprise utilizing the adjusted amplitudes to determine a characteristic of a region corresponding to the different relative azimuthal positions, wherein the region is of either: cement substantially surrounding a casing within the wellbore; or a subterranean formation into which the wellbore extends. The downhole tool may be eccentered within the wellbore, such that the determined characteristic at one or more of the different relative azimuthal positions would be inaccurate if determined utilizing the measured amplitudes instead of the adjusted amplitudes.

Adjusting the measured amplitudes may comprise: determining a correction function based on the measured arrival times and at least one of a plurality of AER variables; and determining the adjusted amplitudes based on the correction function. The AER variables may include one or more of: azimuthal and/or axial separations between the transmitter and the receivers; diameter of the wellbore; inner diameter, outer diameter, and/or radial thickness of a casing of the wellbore; radial thickness of cement substantially surrounding the casing within the wellbore; and/or composition, density, acoustic slowness, and/or other qualities of drilling mud substantially surrounding the downhole tool within the casing. The downhole tool may be eccentered within the wellbore, and the correction function may be based on: variation of the measured arrival times as a function of azimuth; actual radial positions of the transmitter and receivers within the wellbore; and hypothetical radial positions of the transmitter and receivers based on the downhole tool hypothetically being centered within the wellbore. Determining the adjusted amplitudes based on the correction function may comprise adjusting each measured amplitude by a corresponding correction factor determined utilizing the correction function. The correction factors may be determined by Equation (1) set forth above.

The present disclosure also introduces a system comprising: a downhole tool for operation within a wellbore, wherein the downhole tool is operable to transmit an acoustic signal and measure amplitudes and arrival times of the acoustic signal at different azimuthal locations; and surface equipment disposed at a wellsite surface from which the wellbore extends, wherein one or both of the downhole tool and/or the surface equipment are individually and/or cooperatively operable to adjust each measured amplitude based on the measured arrival times, collectively, to compensate for error in each measured amplitude resulting from eccentering of the downhole tool within the wellbore.

One or both of the downhole tool and/or the surface equipment may be individually and/or cooperatively further operable to determine a characteristic at azimuthally different locations of a region utilizing the adjusted amplitudes. The region may be of either: cement substantially surrounding a casing of the wellbore; or a subterranean formation into which the wellbore extends.

Adjusting each measured amplitude may comprise: determining a correction factor based on the measured arrival times, collectively, and at least one of a plurality of AER variables; and adjusting the measured amplitude based on the correction factor. The AER variables may include azimuthal and/or axial separations between: a transmitter that transmits the acoustic signal; and at least one of a plurality of receivers each disposed at a corresponding one of the different azimuthal locations and generating signals indicative of the measured amplitudes and arrival times. The AER variables may also include one or more of: diameter of the wellbore; inner diameter, outer diameter, and/or radial thickness of a casing of the wellbore; radial thickness of cement surrounding the casing within the wellbore; and composition, density, acoustic slowness, and/or other qualities of drilling mud substantially surrounding the downhole tool within the wellbore. The downhole tool may comprise: a transmitter that transmits the acoustic signal; and receivers disposed at corresponding ones of the different azimuthal locations and generating signals indicative of the measured amplitudes and arrival times. The correction factor may be based on: variation of the measured arrival times as a function of azimuth; actual radial positions of the transmitter and receivers within the wellbore; and hypothetical radial positions of the transmitter and receivers based on the downhole tool hypothetically being centered within the wellbore. For example, the correction factors may be determined by Equation (1) set forth above.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
   transmitting an acoustic signal from a downhole tool positioned within a wellbore;
   measuring amplitudes and travel times of the acoustic signal received at different azimuthal locations of the downhole tool;
   determining correction factors, each corresponding to a different one of the measured amplitudes, based on the travel times measured at each of the different azimuthal locations; and
   determining corrected amplitudes each based on the corresponding measured amplitude and the corresponding correction factor,
   wherein determining the correction factors is further based on at least one of a plurality of acoustic-error-related (AER) variables, and wherein the AER variables include at least:
   azimuthal separation between:
      a transmitter of the downhole tool that transmits the acoustic signal; and
      at least one of a plurality of receivers of the downhole tool, wherein the receivers are each disposed at a corresponding one of the different azimuthal locations and generate signals indicative of the measured amplitudes and arrival times;
   axial separation between the transmitter and at least one of the receivers;
   diameter of the wellbore;
   inner diameter of a casing of the wellbore;

outer diameter of the casing;
radial thickness of the casing;
radial thickness of cement substantially surrounding the casing within the wellbore;
composition of drilling mud substantially surrounding the downhole tool within the casing;
density of the drilling mud;
acoustic slowness of the drilling mud.

2. The method of claim 1 further comprising utilizing the corrected amplitudes to determine a characteristic of a region corresponding to the different azimuthal locations, wherein the region is of either:
cement substantially surrounding a casing within the wellbore; or
a subterranean formation into which the wellbore extends.

3. The method of claim 2 wherein the characteristic is one of:
bonding quality between the cement and the casing;
a degree of existence or non-existence of the cement; and
an elastic property of the subterranean formation.

4. The method of claim 2 wherein the downhole tool is eccentered within the wellbore, such that the determined characteristic corresponding to one or more of the different azimuthal locations would be inaccurate if determined utilizing the measured amplitudes instead of the corrected amplitudes.

5. The method of claim 1 wherein the correction factors are determined utilizing a look-up table that predicts the correction factors based on:
one or more of the measured travel times; and
one or more of the AER variables.

6. The method of claim 1 wherein the downhole tool is eccentered within the wellbore, and wherein the correction factors are determined utilizing:
variation of the measured travel times as a function of azimuth;
actual radial positions of the transmitter and receivers of the eccentered downhole tool; and
hypothetical radial positions of the transmitter and receivers based on the downhole tool hypothetically being centered within the wellbore.

7. A method comprising:
conveying a downhole tool within a wellbore, wherein the downhole tool comprises a transmitter and a plurality of receivers, and wherein the receivers are disposed at different relative azimuthal positions;
operating the downhole tool to:
transmit an acoustic signal from the transmitter; and
obtain measured amplitudes and arrival times of the acoustic signal at each of the receivers; and
adjusting the measured amplitudes based on the measured arrival times and on at least one of a plurality of acoustic-error-related (AER) variables, and wherein the AER variables include at least:
azimuthal separation between:
a transmitter of the downhole tool that transmits the acoustic signal; and
at least one of a plurality of receivers of the downhole tool, wherein the receivers are each disposed at a corresponding one of the different azimuthal locations and generate signals indicative of the measured amplitudes and arrival times;
axial separation between the transmitter and at least one of the receivers;
diameter of the wellbore;
inner diameter of a casing of the wellbore;
outer diameter of the casing;
radial thickness of the casing;
radial thickness of cement substantially surrounding the casing within the wellbore;
composition of drilling mud substantially surrounding the downhole tool within the casing;
density of the drilling mud;
acoustic slowness of the drilling mud.

8. The method of claim 7 further comprising utilizing the adjusted amplitudes to determine a characteristic of a region corresponding to the different relative azimuthal positions, wherein the region is of either:
cement substantially surrounding a casing within the wellbore; or
a subterranean formation into which the wellbore extends.

9. The method of claim 8 wherein the downhole tool is eccentered within the wellbore, such that the determined characteristic at one or more of the different relative azimuthal positions would be inaccurate if determined utilizing the measured amplitudes instead of the adjusted amplitudes.

10. The method of claim 7 wherein adjusting the measured amplitudes comprises:
determining a correction function based on the measured arrival times and the at least one of a plurality of acoustic-error-related (AER) variables; and
determining the adjusted amplitudes based on the correction function.

11. The method of claim 10 wherein the downhole tool is eccentered within the wellbore, and wherein the correction function is based on:
variation of the measured arrival times as a function of azimuth;
actual radial positions of the transmitter and receivers within the wellbore; and
hypothetical radial positions of the transmitter and receivers based on the downhole tool hypothetically being centered within the wellbore.

12. The method of claim 11 wherein determining the adjusted amplitudes based on the correction function comprises adjusting each measured amplitude by a corresponding correction factor determined utilizing the correction function.

13. The method of claim 12 wherein the correction factors are determined by the equation:

$$g_i(t_i, r_i) = [\Delta t_i / \max(\Delta t_i)] \cdot A \cdot \log_{10}(r_{eccenter} / r_{center})$$

where:
the plurality of receivers includes a number n of receivers;
the subscript i is an index from 1 to n;
$t_i$ is the measured arrival time at the ith receiver at the ith azimuthal position;
$g_i$ is the correction function for $t_i$;
$r_i$ is the ith receiver at the ith azimuthal position;
$\Delta t_i$ is the difference between $t_i$ and $t_x$, a specific one of the measured arrival times;
$\max \Delta t_i$ is the maximum of each of the $\Delta t_i$;
A is an adjustment effectiveness parameter;
$r_{eccenter}$ is actual radial position, from a longitudinal axis of the wellbore, of $r_i$; and
$r_{center}$ is hypothetical radial position, from the longitudinal axis, of $r_i$ with the downhole tool centered within the wellbore.

14. A system comprising:
a downhole tool for operation within a wellbore, wherein the downhole tool is operable to transmit an acoustic signal and measure amplitudes and arrival times of the acoustic signal at different azimuthal locations; and surface equipment disposed at a wellsite surface from which the wellbore extends, wherein one or both of the downhole tool and/or the surface equipment are individually and/or cooperatively operable to adjust each measured amplitude based on the measured arrival times, collectively, on at least one of a plurality of acoustic-error-related (AER) variables to compensate for error in each measured amplitude resulting from eccentering of the downhole tool within the wellbore, wherein the AER variables include at least:

azimuthal separation between:
- a transmitter of the downhole tool that transmits the acoustic signal; and
- at least one of a plurality of receivers of the downhole tool, wherein the receivers are each disposed at a corresponding one of the different azimuthal locations and generate signals indicative of the measured amplitudes and arrival times;

axial separation between the transmitter and at least one of the receivers;

diameter of the wellbore;

inner diameter of a casing of the wellbore;

outer diameter of the casing;

radial thickness of the casing;

radial thickness of cement substantially surrounding the casing within the wellbore;

composition of drilling mud substantially surrounding the downhole tool within the casing;

density of the drilling mud;

acoustic slowness of the drilling mud.

15. The system of claim 14 wherein one or both of the downhole tool and/or the surface equipment are individually and/or cooperatively further operable to determine a characteristic at azimuthally different locations of a region utilizing the adjusted amplitudes, and wherein the region is of either:

cement substantially surrounding a casing of the wellbore; or a subterranean formation into which the wellbore extends.

16. The system of claim 14 wherein adjusting each measured amplitude comprises:

determining a correction factor based on the measured arrival times, collectively, and the at least one of a plurality of acoustic-error-related (AER) variables; and adjusting the measured amplitude based on the correction factor.

17. The system of claim 14 wherein:

the downhole tool comprises:
- a transmitter that transmits the acoustic signal; and
- receivers disposed at corresponding ones of the different azimuthal locations and generating signals indicative of the measured amplitudes and arrival times; and the correction factor is based on:
- variation of the measured arrival times as a function of azimuth;
- actual radial positions of the transmitter and receivers within the wellbore; and
- hypothetical radial positions of the transmitter and receivers based on the downhole tool hypothetically being centered within the wellbore.

* * * * *